United States Patent [19]

Sebazco

[11] Patent Number: 5,666,857

[45] Date of Patent: Sep. 16, 1997

[54] STEERING AND BRAKING CONTROL SYSTEM FOR A VEHICLE

[76] Inventor: Roy Sebazco, P.O. Box 2086, East Hampton, N.Y. 11937

[21] Appl. No.: 544,676

[22] Filed: Oct. 18, 1995

[51] Int. Cl.⁶ .............................. B60K 41/20; G05G 11/00
[52] U.S. Cl. .................. 74/481; 74/106; 74/482; 74/486; 180/333; 188/350; 280/88
[58] Field of Search .................. 74/481, 482, 486, 74/492, 106; 180/333; 188/350; 280/88

[56] References Cited

U.S. PATENT DOCUMENTS

| | | | |
|---|---|---|---|
| 1,519,172 | 12/1924 | Stewart | 74/486 |
| 1,841,294 | 4/1932 | Nicholson | 280/88 |
| 2,223,800 | 12/1940 | Fines | 188/350 |
| 2,470,273 | 5/1949 | Uffel | 74/481 |
| 2,471,244 | 5/1949 | Self | 188/350 |
| 2,648,993 | 8/1953 | Kemp | 74/486 |
| 4,078,628 | 3/1978 | Reichenberger | 180/333 |

*Primary Examiner*—Charles A. Marmor
*Assistant Examiner*—Troy Grabow
*Attorney, Agent, or Firm*—Howard C. Miskin

[57] ABSTRACT

A steering and control system is disclosed which includes a steering wheel that not only allows for the operator to accomplish the steering of a vehicle, but also allows the operator to merely exert a force on the steering to control the braking mechanism of a vehicle. The steering wheel, acting as a unitary device for controlling two of the principal operations of a vehicle, provides the operator with improved handling capabilities and does so without the operator needing to use his/her feet which makes the control system of the vehicle particularly suited for handicapped individuals.

14 Claims, 2 Drawing Sheets

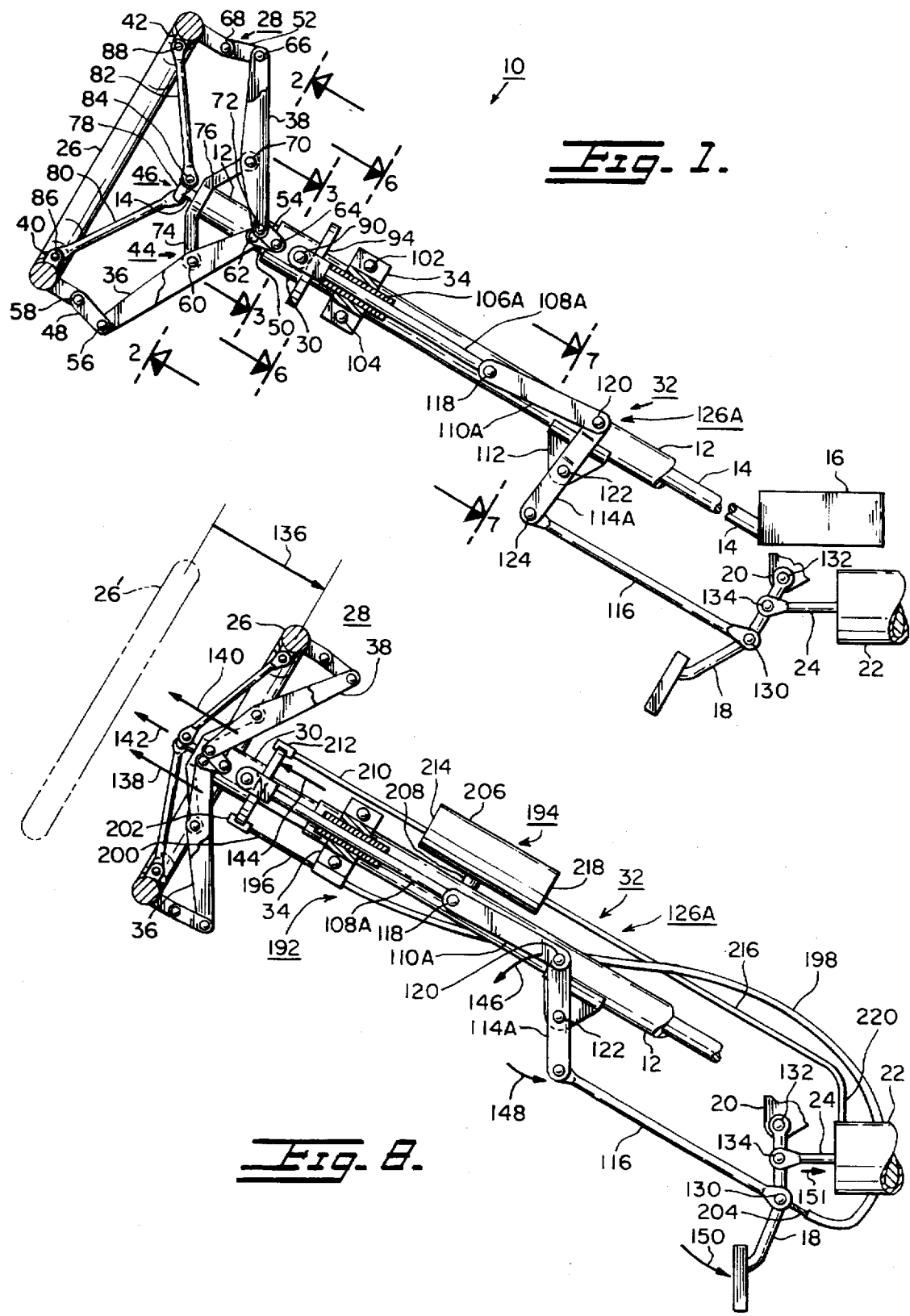

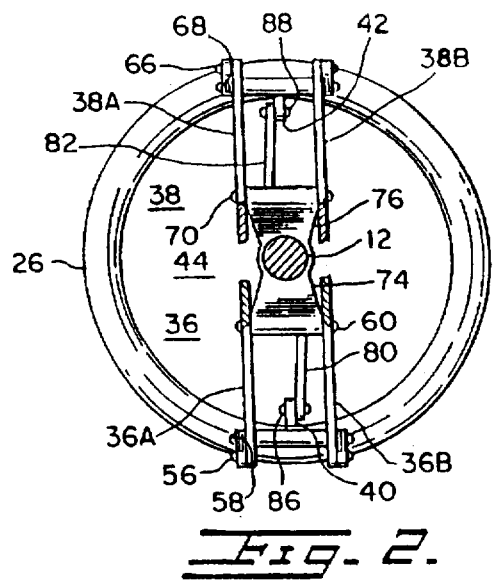
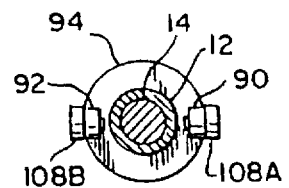
Fig. 3.
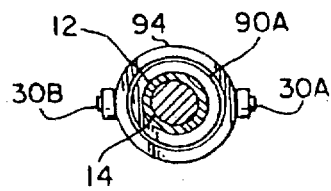
Fig. 4.
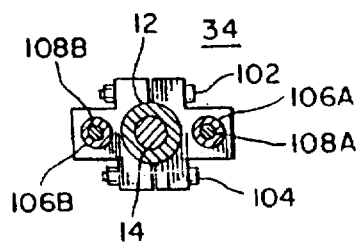
Fig. 6.
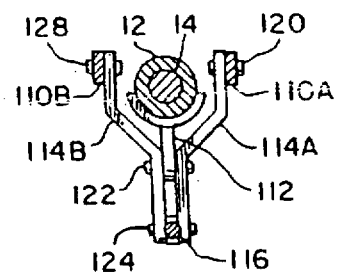
Fig. 7.
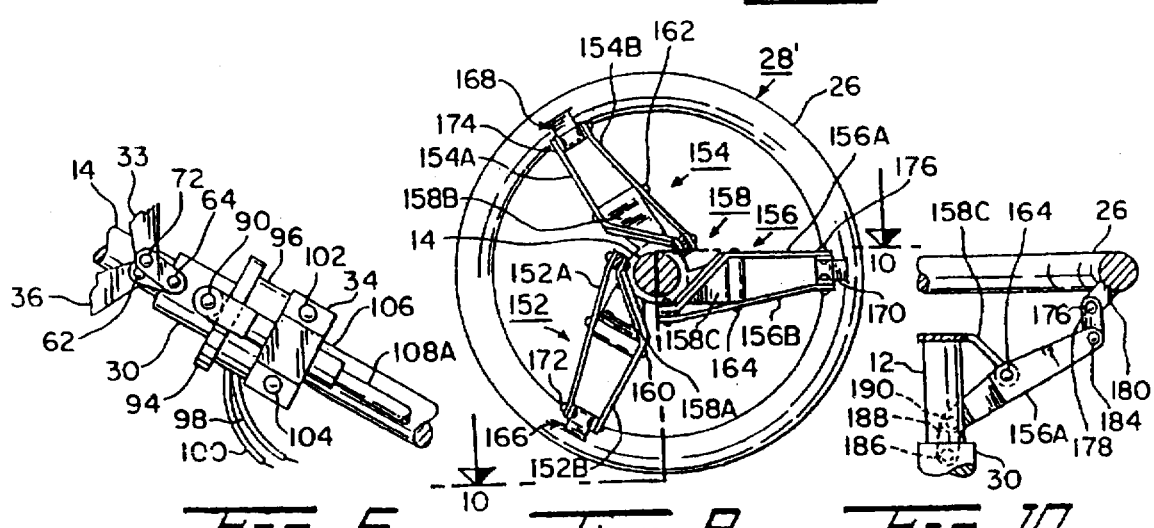
Fig. 2.
Fig. 5. Fig. 9. Fig. 10.

STEERING AND BRAKING CONTROL SYSTEM FOR A VEHICLE

The present invention relates to a steering and braking control system for a vehicle. More particularly, the present invention relates to a system utilizing the steering wheel to accomplish both the steering and braking operations of the vehicle. Specifically, the present invention relates to a system wherein the steering is accomplished in a normal manner by the operator, but the driver need only push forward on the steering wheel to accomplish the braking operations.

BACKGROUND OF THE INVENTION

Recently, Federal and State governments have made major strides to allow disabled individuals, such as paraplegics, to pursue occupations of their choice. A paraplegic may suffer paralysis of the lower half of his/her body involved with the movement of both legs which prevents his/her driving of a typical automobile and, thus, hindering his/her entrance into the work force. Although the paraplegic may be lacking in strength of his/her lower half of the body, more than likely, the paraplegic develops superior upper body strength, to more than compensate for their disability. It is desired that automobiles be provided having operator control systems that make use of the paraplegic's upper body and do not require the use of his/her legs.

Automobiles that employ control systems that do not require the use of the operator's leg to control the automobile, such as to perform braking operations, are known and some of which are described in U.S. Pat. Nos. 656,962 ('962); 2,471,244 ('244) and 3,117,649 ('649), all of which are herein incorporated by reference. The '962 patent discloses a system having a single device that is used to control the steering, acceleration, and braking of the vehicle, but this device is a bar handle which has limitations, especially, in the steering aspects of the automobile by present-day drivers who are used to the handling provided by a steering wheel. The '244 patent uses a primary steering wheel to accomplish the steering of an automobile and which coacts with an auxiliary steering wheel to assist in the braking operations of the automobile, but the operator's usage of two devices to control one automobile may disadvantageously cause the operator to lose the "feel" of the operating characteristics of the automobile. The '649 patent discloses an automobile that has a single handle to control the principal operations of an automobile which are the steering, acceleration and braking. However, the usage of a single handle to control an automobile has limitations, especially as mentioned for the '962 patent, to one who is accustomed to steering an automobile by the use of a steering wheel. It is desired that a control system be provided for an automobile that does not require the use of the legs of the operator to accommodate the braking operation but does not suffer from prior art limitations.

In addition to the desires of the handicapped individuals, a non-handicapped person may also desire a control system that does not require the use of his/her legs, especially, if it allows for a system that more readily controls the automobile. This enhanced control system is particularly suited for racing cars or even in less vigorous recreation endeavors, such as in the use of golf carts. It is desired that a control system for all types of motorized vehicles be provided that enhances the handling of the vehicles but does not require the use of the legs of the operator.

Accordingly, it is a principal object of the present invention to provide a system for an a vehicle that does not require the use of the legs of the operator to control the automobile, yet provides for enhanced handling capabilities.

It is another object of the present invention to provide a control system for an automobile that is particularly suited for a paraplegic having paralysis of the lower half of the body but also having upper-half body strength that more than compensates for the loss of movement of the lower half of the body.

Still further, it is an object of the present invention to provide a control system that does not require the use of legs but does include a steering wheel and which control system may be adapted to various vehicles including motorized devices such as racing cars, wheelchairs, or golf carts.

These and other objects of the present invention as well as advantages thereof over existing prior art forms will be apparent in view of the following detailed description of the invention and the accompanying claims.

SUMMARY OF THE INVENTION

The present invention is directed to a system for operating an automobile that does not require the use of the legs of the operator, yet provides a system that is readily accepted by all users and leads to enhanced operator handling capability.

The control system of the present invention comprises a steering wheel, a pivotal mechanism, a sleeve, and a force translating mechanism. The pivotal mechanism has first and second ends with an intermediate portion therebetween. Each end having connecting means, with the first end connected to the steering wheel and the intermediate portion having means for connecting to the steering column. The pivotal mechanism is arranged so as to draw the second end in the opposite direction of the first end when a substantially axial force is exerted on the steering wheel. The sleeve is located on the steering column of a vehicle and has a bore dimensioned to allow the passage of the steering shaft of the vehicle. The sleeve has first and second ends with the first end connected to the connecting means of the second end of the pivotal mechanism. The force translating means has first and second ends each with means for connecting. The first end of the force translating means has its connecting means connected to the second end of the sleeve, whereas the second end of the force translating means has its connecting means connected to a brake pedal.

The arrangement of the control system allows the operator to steer the vehicle with the steering wheel and the operator needs only exert a force on the steering wheel to cause the brake pedal to be forced downward and arrest the motion of the vehicle.

BRIEF DESCRIPTION OF THE DRAWINGS

FIG. 1 is a schematic illustration in which the steering wheel of the steering and control system of the present invention is turned 90 degrees, relative to its at-rest position, primarily to illustrate, in the same view, all of the movements of the linkages.

FIG. 2 is a view, taken along the line 2—2 of FIG. 1, illustrating details of the pivotal mechanism of the present invention.

FIG. 3 is a view, taken along the line 3—3 of FIG. 1, illustrating the relationship between the sleeve of the present invention and the steering column and steering shaft both of a vehicle.

FIG. 4 is an alternate embodiment of FIG. 3 in which the two relatively small bearings of FIG. 3 are replaced by a relatively large one.

FIG. 5 is an optional solution, using an electromagnet, to allow one to automatically engage or disengage the use of the steering wheel to control the braking of the vehicle.

FIG. 6 is a view, taken along line 6—6 of FIG. 1, illustrating the interconnections between the guiding mechanism and the force translating mechanism both of the present invention.

FIG. 7 is a view, taken along line 7—7 of FIG. 1, illustrating some of the interconnections of the force translating mechanism of the present invention.

FIG. 8 is similar to FIG. 1 and illustrates the overall operation of the present invention and alternative embodiments of the present invention.

FIG. 9 is similar to FIG. 2 and illustrates an alternate embodiment of a pivotal mechanism of the present invention.

FIG. 10 is a view, taken along line 10—10 of FIG. 9, illustrating the interconnection between the steering column and steering wheel of the alternate embodiment of FIG. 9.

DETAILED DESCRIPTION OF THE PREFERRED EMBODIMENTS

Referring to the drawings, wherein the same reference numbers illustrate the same elements throughout, there is shown in FIG. 1 a schematic illustration of the steering and braking control system 10 of the present invention. The steering and control system 10 is coupled to the steering column 12 of a vehicle having an uppermost portion and confining a steering shaft 14 that is connected to the steering mechanism 16 of the vehicle. As seen in FIG. 1, the steering column 12 has a longitudinally extending axis. The vehicle also has a brake pedal 18, typically coupled to the interior 20 of the vehicle and connected to the brake mechanism 22, commonly by way of a push rod 24 of the braking mechanism, normally being a master brake cylinder.

The operational functions of the steering and braking control system 10 is solely performed by an operator's use of a steering wheel 26, more particularly, without the use of the operator's feet to provide for the braking operation. The steering wheel 26 is shown in FIG. 1 as being turned 90 degrees, from its at-rest position, primarily to illustrate (in the same view) all the movements of the linkage of the steering and braking control system 10. FIG. 1 also illustrates that the rotation of the steering wheel 26, as will be further described, does not affect the brake system of the vehicle in which the steering and braking control system 10 is used. The steering and braking control system 10 comprises the steering wheel 26, a pivotal mechanism 28, a sleeve 30, a force translating mechanism 32, and, preferably, a guiding device 34.

The operator uses the steering wheel 26 to perform the steering functions in a normal manner, and when it is desired to brake the vehicle, the operator need only exert a force on the same steering wheel 26 to cause the pivotal mechanism 28, coacting with the sleeve 30 and the force translating mechanism 32, to act in a manner similar as a cork screw device, so as to draw upward the sleeve 30 which, in turn, draws upward the force translating mechanism 32 which, in turn, and conversely, causes the brake pedal 18 to be pressed downward, thereby, arresting the motion of the vehicle by means of the vehicle's braking mechanism 22.

The pivotal means 28 of FIG. 1 comprises first and second arms 36 and 38, first and second securing means 40 and 42 locked to or embedded in the steering wheel 26, a yoke 44, and a fastening means 46. The arm 36 has pivotal links 48 and 50 attached to opposite ends and, similarly, the arm 38 has pivotal links 52 and 54 attached to opposite ends, The pivotal link 48 is attached to the arm 36 by a retaining pin 56 and to an extension of the first securing means 40 by a retaining pin 58, The central region of the arm 36 is attached to the yoke 44 by a retaining pin 60 and one end of the arm 36 is attached to the pivotal link 50 by a retaining pin 62.

As seen in FIG. 1, the location of retaining pin 60 correspondingly defines the central region of arm 36 which is interposed between the first and second ends of the arm 36. Similarly, as further seen in FIG. 1, the location of retaining pin 70 defines the central region of arm 38 which is interposed between the first and second ends of the arm 38. Furthermore, the terminology "central region," "central portion," or "intermediate portion," is used herein in an interchangeable manner and all such useages are meant to correspond to the intermediate location between the first and second ends of a structural element of the present invention, such as arm 36 or 38. A retaining pin 64 also attaches the arm 36 to the sleeve 30, as well as attaching one end of the arm 38 to the sleeve 30. The other end of the arm 38 is attached to the pivotal link 52 by a retaining pin 66 and the other end of the pivotal link 52 is attached to an extension of the second securing means 42 by means of a retaining pin 68. The central region of the arm 38 is attached to the yoke 44 by a retaining pin 70 and one end of the arm 38 is attached to the pivotal link 54 by retaining pin 72.

The yoke 44 has first and second shoulders 74 and 76 respectively connected to the first and second arms 36 and 38 via the retaining pins 60 and 70. The yoke 44 has a collar placed on top of the uppermost portion of the steering column 12.

The fastening means 46 has jaws 78 (not fully shown) connected to the steering shaft 14 that extends out of the yoke 44. The jaws 78 have provisions for receiving a retaining pin and may take the form, similar to that used in an automobile, of a nut that is threadably engaged to the steering shaft 14. The fastening means 46 further comprises first and second control bars 80 and 82 both of which have rod ends that pivot and one such end has provisions to accept a retaining pin 84 so as to totally fasten to the jaws 78. The other end of the control bars 80 and 82 also have rod ends that pivot and which are pivotally connected to extensions of the first and second securing means 40 and 42 by means of retaining pins 86 and 88 respectively. As will be described, although the jaws 78 engage and rotate the steering shaft 14, bearing means located proximate the sleeve 30 allow the sleeve 30 to rotate with the steering wheel 26, while the force translating means 32 maintains its axial orientation ready to be forced downward onto the arm of the brake pedal 18. The interconnections of the pivotal mechanism 28 may be further described with reference to FIG. 2 which is a cross-sectional view, taken along line 2—2, of FIG. 1.

As seen in FIG. 2, the arms 36 and 38, in actuality, each comprises two separate parallel plates 36A and 36B and 38A and 38B respectively. Further, as seen in FIG. 2, the shoulders 74 and 76 of yoke 44 are actually merged together and are separated from each other to provide the previously mentioned collar of yoke 44 and also a central bore therebetween that allows for the passage of the steering shaft 14 and exit thereof so as to be connected to the jaws 78 previously described with reference to FIG. 1.

As seen in FIG. 1, the sleeve 30 is connected to the lower end of the arms 36 and 38 by means of pin 64. The sleeve 30 also surrounds the steering column 12 which may be further described with reference to FIG. 3 which is a view, taken along line 3—3, of FIG. 3.

FIG. 3 illustrates two relatively small bearings 90 and 92 each having protrusions (not shown) by which the linking rods 108A and 108B (not shown) are hooked onto the sleeve 30 having a rim 94 (also see FIG. 1). The bearings 90 and 92 allowing the rim 94 and, thus, sleeve 30 to roll under them, in cooperation with the linking rods 108A and 108B, serving as cables, provide a motion transfer means in which the bearings 90 and 92 of FIG. 3 allow the axial linking rods 108A and 108B to maintain their axial orientation when the steering wheel 26 and, thus, the sleeve 30 are turned.

An alternate embodiment of the motion transfer means that allows for linking rods 108A and 108B to maintain their axial orientation in spite of any movement of the steering wheel 28 is shown in FIG. 4, in which the two relatively small bearings 90 and 92 are replaced by a relatively large bearing 90A. The linking rods 108A and 108B hook onto protrusions 30A and 30B, respectively, and the bearing 90A operates in a similar manner as described for bearing 90 and 92.

The motion transfer means provided by either of the embodiments of FIGS. 3 and 4 allows the steering wheel 26, attached to arms 36 and 38 and to control arms 80 and 82, to be turned while the linking rods 108A and 108B maintain their axial orientation and are ready to receive an upward force so as to cause the brake pedal 18 to be pressed downward in a manner as to be described hereinafter with reference to FIG. 8. Either of these motion transfer means may be arranged so that the linking rods 108A and 108B may be automatically disengaged from the sleeve in response to an electrical signal and such disengagement may be described with reference to FIG. 5.

FIG. 5 is an optional solution to disengage or to secure the sleeve 30 to the steering wheel 26. The disengagement/engagement is provided by means of an electromagnet solenoid 96, which when activated pulls sleeve 30 downwardly into a locked position. More particularly, when an able-body human being no longer desires the benefits of the present invention he/she needs only actuate a switch (not shown) to supply an electrical signal, via signal paths 98 and 100, to the electromagnet solenoid 96 actuating the solenoid 96 to freeze the sleeve 30 in an inoperative position from the steering wheel 26. The sleeve 30 pushes the steering wheel 26 up and freezes it in this position, thereby, disengaging the brake operating system as described.

As seen in FIG. 5, the guide means 34, having fasteners 102 and 104, is located below the sleeve 30 having a hat-like structure with a crown and brim 94. As seen more clearly in FIG. 3, the brim 94 is an annular flange having an opening dimensioned so as to form the bore of the sleeve 30. The guide means 34, as best seen in FIG. 3, fits over tubes 106A (also shown in FIG. 1 in cross-section) and 106B (not shown). As shown, the guide means 34 in actuality is located on opposite sides of the steering column 12. In actuality, the guide means 34 may be slightly different for each automotive manufacturer due to manufacturing differences therebetween. The guide means 34 may be further described with reference to FIG. 6 which is a view, taken along line 6—6, of FIG. 1.

As seen in FIG. 6, the guide means 34 has openings arranged from each other on opposite sides of the steering column 12 that respectively retain tubes 106A and 106B which, in turn, respectively allow for the passage therein of first and second linking rods 108A and 108B which are both part of the force translating mechanism 32 that may be further described with reference back to FIG. 1. FIG. 1 illustrates one side of the force translating mechanism 32 having elements identified with the reference letter A, but the force translating mechanism 32 also has respectively similar elements on the non-illustrated side identified herein with the reference letter B.

The force translating mechanism 32 further comprises first and second axial linking members 110A and 110B, a bracket 112, first and second offset linking members 114A and 114B and a connecting rod 116. The elements 108B and 110B, are not illustrated in FIG. 1 but are connected in the same manner as their counterparts 108A and 110A. The first linking rod 108A is connected to the first axial linking member 110A by means of a retaining pin 118. The first axial linking member 110A is connected to the first offset linking member 114A by means of retaining pin 120. The first offset linking member 114A is connected to the bracket 112 by a retaining pin 122 and to the connecting rod 116 by a retaining pin 124, each pin 122 and 124 to be further described with reference to FIG. 7. The retaining pins 122 and 124, as well as other retaining pins of the force translating mechanism 32, serve as means for allowing pivoting between interconnected members of the force translating mechanism 32. The first offset linking member 114A is joined to the first linking member 110A in a non-axial manner, that is, in a substantially perpendicular manner as viewed in FIG. 1. More particularly, the connection between the first axial linking member 110A and the offset linking member 114A are brought together in such a manner as to establish a knee region 126A, sometimes referred to as a bell crank, to be further described with reference to FIG. 8. Further connections of the offset linking member 114A, as well as the second offset linking member 114B may be further described with reference to FIG. 7 which is a view, taken along line 7—7, of FIG. 1.

As seen in FIG. 7, the first offset linking member 114A, as well as the second offset linking member 114B, have arms that extend outward so that the distance therebetween is greater than the diameter of the steering column 12. The first and second offset linking members 114A and 114B are connected to an extension of bracket 112 by the retaining pin 122 and to the connecting rod 116 by retaining pin 124. The offset linking member 114B is connected to the second axial linking member 110B by a retaining pin 128. Further connections of the connecting rod 116 may be further described with reference back to FIG. 1.

The connecting rod 116 is connected to the brake pedal 18 by means of retaining pin 130. The brake pedal 18, in turn, is connected to the interior 20 of the vehicle by a retaining pin 132 and to the push rod 24 by means of a retaining pin 134. The push rod 24 controls the booster brake cylinder 22 which, in turn, controls the braking operation of the vehicle employing the steering and braking system 10 of the present invention. The operation of the present invention may be further described with reference to FIG. 8 which illustrates the movement of the pertinent linkages of the steering and braking control system 10 that push down onto the arm of the brake pedal 18.

OPERATION OF THE STEERING AND BRAKING SYSTEM

In operation, the steering of the vehicle is accomplished in the normal manner by the operator using the steering wheel 26. However, in accordance with the practice of the present invention, if the operator desires to stop the vehicle, he/she need only apply a downward force, in a forward direction relative to the operator, on the steering wheel 26. The use of the steering wheel 26 combined with the pivotal elements of the steering and braking system 10 provide maximum force to the brake pedal 18 with minimum of effort on the part of the operator. The downward force applied by the operator causes the steering wheel 26 to move from its original position, indicated by the phantom representation identified by reference number 26', to its downward position indicated by the solid representation identified by reference number 26. The downward movement of the steering wheel 26 is shown by the directional arrow 136. The downward force exerted on the steering wheel 26 causes the pivotal links 48 and 52 of arms 36 and 38, respectively, to buckle outward and acquire a relatively straight orientation. Further downward force exerted on the steering wheel 26 is now transferred to the arms 36 and 38 and creates upwardly directed forces indicated by directional arrows 138 and 140, respectively, which are combined, because of the structure of the pivot mechanism 28, into an upward force indicated by arrow 142. The upward force indicated by arrow 142 in turn causes the central portion of the pivot mechanism 28 to raise the sleeve 30 in the upward direction indicated by arrow 144. The upward movement of sleeve 30 causes the force translating mechanism 32 to tend to straighten its first and second linking members 110A and 110B which, in turn, causes the joint 120 between axial linking members 110A and 110B and offset linking members 114A and 114B to move inward as indicated by directional arrow 146 carrying with it the axial offset linking members 114A and 114B. As the joint 120 is forced to move inward, it causes the axial offset linking members 114A and 114B, which are pivoted about the pin 122, to be moved downward in a pivotal manner away from the axial linking members 110A and 110B and in a counterclockwise direction indicated by arrow 148. As further seen in FIG. 8, the axial linking members 110A and 110B transversely move along side of the steering column 12 in response to the axial force exerted on the steering wheel 26. The counterclockwise movement of the offset linking members 114A and 114B in turn, cause a downward movement of the connecting bar 116 which, in turn, exerts a force on the arm of the brake pedal 18 so that the face of the brake pedal 18 is moved downward as indicated by directional arrow 150 which, in turn, causes the push rod 24 to be moved inward as indicated by directional arrow 151 which, in turn, causes the braking mechanism 22 to arrest the motion of the vehicle housing the braking and control system 10.

It should now be appreciated that the practice of the present invention provides for a steering and braking control system 10 that not only serves as a steering control device but also, by simply exerting a force on the steering wheel, allows the operator of the vehicle to control the braking action of the vehicle.

A further embodiment of the present invention that coacts with the steering wheel 26 may be further described with reference to FIG. 9. FIG. 9 illustrates a pivotal mechanism 28' that operates in a similar manner as that of the previously described pivotal mechanism 28 but has a three arm arrangement instead of the two arm arrangement of the pivotal mechanism 28 illustrated in FIG. 2. The pivotal mechanism 28' comprises first, second and third arms 152, 154 and 156 each respectively comprised of pairs of plates 152A and 152B, 154A and 154B, 156A and 156B each pair having one of its plates (152B, 154B and 156B) contoured so that the plates of the pairs are merged together at one end as shown in FIG. 9. The central portion of the first, second and third arms 152, 154 and 156 are respectively connected to a yoke 158, more particularly, to first, second and third shoulders 158A, 158B and 158C by retaining pins 160, 162 and 164 respectively. In a manner similar to that as previously described for arms 36 and 38, the central portion of the first, second, and third arms is located between respective first and second ends. Further, the first, second and third arms 152, 154 and 156 are connected to the steering wheel 26 by means of securing means 166, 168 and 170 by means of retaining pins 172, 174 and 176. Securing means 166, 168 and 170 are essentially the same as securing means 40 and 42 that are locked on or embedded in the steering wheel 26. The connection of the steering wheel 26 to the arms 152, 154 and 156, in particular, to the plate 156A of arm 156 may be further described with reference to FIG. 10 which is a view taken along line 10—10 of FIG. 9.

As seen in FIG. 10, the plate 156A is connected to the steering wheel 26 by means of pivotal link 178 which is connected to a projection 180 of the securing means 170 by means of the retaining pin 176. The pivotal link 178 is connected to the plate 156A by retaining pin 184. Further, as seen in FIG. 10, the plate 156A is connected to sleeve 30 by means of retaining pin 186 and to a second link 188 of plate 156A by a retaining pin 190.

The steering wheel 26 connected to the three arms 152, 154 and 156 operates in a similar manner as previously described with reference to FIG. 8, except that a downward force on the steering wheel 26 is translated by three arms 152, 154 and 156 so as to draw the sleeve 30 upward which, in turn, straightens out the force translating mechanism 32 which, in turn, causes the connecting rod 116 to exert a downward force onto the brake pedal 18 which, in turn, arrests the motion of the vehicle employing the embodiment of FIGS. 9 and 10.

The present invention has alternate force translating embodiments that employ cables and/or hydraulic pistons, each of which cooperates with the pivotal mechanisms of FIGS. 1–10 and each of which may be further described with reference back to FIG. 8.

FIG. 8 illustrates two separate force translating embodiments 192 and 194, each of which is operatively coupled to the steering wheel 26 by means of the pivotal mechanism 28 (FIGS. 1–8) or 28' (FIGS. 9 and 10), more particularly, by means of sleeve 30 of the pivotal mechanism.

The force translating mechanism 192 comprises a cable 196 and an outer covering or sleeve 198 which is attached to the guide means 34. The cable 196 has a first end 200 connected to sleeve 30, by means of a connector 202, and a second end 204 connected (not shown) to the retaining pin 130 which, in turn, is connected to the brake pedal 18. The force translating mechanism 192 may be used in place of or cooperating with the force translating mechanism 32 as a safety feature. In operation, pushing down of the steering wheel 26, previously described, causes the cable 196 to be pulled up by way of the first end 200 and connector 202 which, in turn, causes the second end 204 to be pulled inward causing the brake pedal to be moved downward in direction 150, thereby, operating the braking mechanism 22.

The force translating mechanism 194 comprises a hydraulic piston 206 mounted to the steering column 12 by a leg 208. The hydraulic piston 206 has a control rod or arm 210 having a first end 212 attached to sleeve 30, and a second end 214 that movably enters and exits the hydraulic piston 206. The hydraulic piston 206 also has a control line 216 serving as a hydraulic line. The control line 216 has a first end 218 operatively coupled to the hydraulic piston 206 and a second end 220 operatively coupled to the braking mechanism 22. The hydraulic piston 206 is of a conventional type and may comprise a sliding piece, such as control rod 210, whose movement creates a fluid pressure that is applied to the braking mechanism 22, via the hydraulic line 216.

The force translating mechanism 194, shown in FIG. 8 as being located below the steering wheel 26, may be operated such that the pushing downward of steering wheel 26 causes the hydraulic piston 206 to exert a hydraulic pressure, via hydraulic line 216, that is applied to braking mechanism 22 which correspondingly causes a braking action to be applied to the vehicle. For such downward movement of steering wheel 26, the hydraulic piston 206 would need to be arranged so that upward movement of its control rod 216, following its attached-to-sleeve 30, exerts a hydraulic pressure operatively coupled to the braking mechanism 22. If desired, the force translating mechanism 194 may be arranged to be interconnected to the steering wheel 26 so that downward movement of the steering wheel 26 causes a corresponding downward movement of the control rod 216 which, in turn, is responded to by the hydraulic piston 206 exerting a hydraulic pressure, via hydraulic line 216, that is applied to the braking mechanism 22 which, in turn, correspondingly causes a braking action to be applied to the vehicle.

It should now be appreciated that the practice of the present invention provides for various embodiments of the steering and control system 10 each of which allows the driver of a vehicle, which also includes race cars as well as golf carts, to not only control the steering of the vehicle, but in addition, thereto, allows the operator to merely press on the steering wheel to control the braking operations of the vehicle.

What I claim is:

1. A steering and braking control system for a vehicle with a steering column having a longitudinally extending axis confining a steering shaft that is connected to the steering mechanism of the vehicle, said vehicle also having a brake pedal connected to a braking mechanism of the vehicle, said control system comprising:

(a) a steering wheel;
    (b) a pivotal mechanism having first and second ends with an intermediate portion therebetween, each end having connecting means, with the first end being connected to said steering wheel, means for connecting said intermediate portion to said steering column, said pivotal mechanism being arranged so as to draw said second end in the opposite direction of said first end when a substantially axial force is exerted on said steering wheel;
    (c) a sleeve having a bore dimensioned to allow the passage of the steering shaft, said sleeve having first and second ends with the first end thereof connected to the connecting means of said second end of said pivotal mechanism; and
    (d) a force translating mechanism having first and second ends each with means for connecting, said first end thereof having its connecting means connected to said second end of said sleeve, and said second end of said force translating mechanism having its connecting means connected to said brake pedal.

2. The steering and braking control system according to claim 1, wherein said pivotal mechanism is arranged to have its first end pivotally connected to said steering wheel so that said sleeve is moved toward the steering wheel when said force is exerted on said steering wheel.

3. The steering and braking control system according to claim 2, wherein said force translating mechanism has a linking member interposed between said first and second ends of said force translating mechanism.

4. The steering and braking control system according to claim 3, wherein said force translating mechanism is arranged so that said linking member interposed between said first and second ends moves transversely causing said first and second ends of said force translating mechanism to move away from each other when said sleeve is moved toward the steering wheel in response to said axial force being exerted on said steering wheel.

5. The steering and braking control system according to claim 1, wherein said pivotal mechanism comprises;

(a) at least first and second arms each having first and second ends with an intermediate portion interposed therebetween, said first and second arms having a pivoting link at the first end and their second end connected to said first end of said sleeve;
    (b) at least first and second securing means connected to said steering wheel, each securing means connected to the first end of each arm;
    (c) a yoke having a central collar placed on the uppermost portion of said steering column and having a bore dimensioned to allow the steering shaft to pass therethrough and extend thereout, said yoke having first and second shoulders respectively connected to the intermediate portion of said first and second arms.

6. The steering and braking system according to claim 5, wherein said pivotal mechanism further comprises;

(d) a fastener means having jaws connected to the steering shaft and having first and second control bars having means for being pivotally connected to said jaws.

7. The steering and braking control system according to claim 1, wherein said sleeve has bearing means arranged to allow said first end of said force translating mechanism to remain stationary while said steering wheel is rotated.

8. The steering and braking control system according to claim 1, wherein said sleeve has means to electrically engage/disengage said first end of said force translating mechanism to said sleeve.

9. The steering and braking control system according to claim 1, wherein said sleeve comprises an annular flange having an opening dimensioned so as to form said bore of said sleeve.

10. The steering and braking control system according to claim 1, wherein said force translating mechanism comprises;

(a) at least one linking rod disposed along said steering column and having first and second ends with said first end being connected to said second end of said sleeve;
    (b) at least one axial linking member axially disposed along said steering column and having first and second ends with the first end thereof respectively connected to said second end of said at least one linking rod;
    (c) a bracket attached to said steering column at a location near said second end of said at least one axial linking member and having an outwardly extending portion;
    (d) at least one linking member having first and second ends with an intermediate portion interposed therebetween, said at least one offset linking member having portions outwardly extending from said intermediate portion of said at least one linking member toward said second end of said at least one offset linking member, said first end of said at least one offset linking member connected in a perpendicular orientation to said second end of said at least one axial linking member, said intermediate portions of said at least one offset linking member connected to the end of said outwardly extending portion of said bracket by means for pivoting; and (e) a connecting rod having first and second ends with said first end of said connecting rod connected to said second end of said at least one offset linking member by means for pivoting and said second end of said connecting rod connected to said brake pedal.

11. The steering and braking control system according to claim 10, wherein said steering column has opposite faces and said first end of said force translating mechanism is connected to opposing faces of said second end of said sleeve and wherein said force translating mechanism further comprises;

(a) a second linking rod disposed along a face of said steering column which is opposite said disposed at least one linking rod, said second linking rod having first and second ends with the first end being connected to said second end of said sleeve;

(b) a second axial linking member axially disposed along a face of said steering column which is opposite said axially disposed at least one axial linking member, said second axial linking member having first and second ends with the first end connected to the second end of said second linking rod;

(c) a second offset linking member disposed along a face of said steering column which is opposite said at least one offset linking member, said second offset linking member having first and second ends with an intermediate portion therebetween, said second offset linking member having a portion outwardly extending from the intermediate portion of said second offset linking member toward said second end of second offset linking member, said first end of said second offset linking member connects in a perpendicular orientation to said second axial lining member, said intermediate portion of said second offset linking member connected to the end of said outwardly extending portion of said bracket by means of pivoting, said second end of said second offset linking member connected to said first end of said connecting rod.

12. The steering and braking control system according to claim 10 further comprising a guiding means interposed between said first end of said force translating mechanism and said second end of said sleeve and having tubes for accepting and guiding the movement of said first and second linking rods.

13. The steering and braking control system according to claim 1, wherein said force translating mechanism comprises a cable having first and second ends, said first end of said cable having means for connecting to said second end of said sleeve and said second end of said cable having means for connecting to said brake pedal.

14. The steering and braking control system according to claim 1, wherein said force translating mechanism comprises:

(a) a hydraulic piston;

(b) a control arm having first and second ends with the first end having means for connecting to said second end of said sleeve and the second end of the arm movably coupled to said hydraulic piston;

(c) a hydraulic line having first and second ends with the first end operatively connected to said hydraulic piston and the second end of said hydraulic line operatively connected to said braking mechanism of said vehicle;

whereby movement of said sleeve causes said hydraulic piston to exert a pressure on said braking mechanism, which in turn, exerts a braking action on said vehicle.

* * * * *